Feb. 9, 1954 D. S. RIDLER 2,668,870

PRINTING TELEGRAPH RECEIVER

Filed Aug. 14, 1951 10 Sheets-Sheet 1

Inventor
DESMOND S. RIDLER
By [signature]
Attorney

Feb. 9, 1954 D. S. RIDLER 2,668,870

PRINTING TELEGRAPH RECEIVER

Filed Aug. 14, 1951 10 Sheets-Sheet 2

Inventor
DESMOND S. RIDLER

By R. P. Morris

Attorney

Inventor
DESMOND S. RIDLER
By R. P. Morris
Attorney

Feb. 9, 1954 D. S. RIDLER 2,668,870

PRINTING TELEGRAPH RECEIVER

Filed Aug. 14, 1951 10 Sheets-Sheet 4

Inventor
DESMOND S. RIDLER
By R P Morris
Attorney

PRINTING TELEGRAPH RECEIVER

Filed Aug. 14, 1951 10 Sheets-Sheet 5

*Inventor*
DESMOND S. RIDLER
*By* R. F. Morris
*Attorney*

Inventor
DESMOND S. RIDLER
By R P Morris
Attorney

Feb. 9, 1954

D. S. RIDLER 2,668,870

PRINTING TELEGRAPH RECEIVER

Filed Aug. 14, 1951

10 Sheets-Sheet 7

*Inventor*
DESMOND S. RIDLER
*By* R. P. Morris
*Attorney*

*Inventor*
DESMOND S. RIDLER
*By* R. P. Morris
*Attorney*

Inventor
DESMOND S. RIDLER
By R P Morris
Attorney

Feb. 9, 1954 D. S. RIDLER 2,668,870

PRINTING TELEGRAPH RECEIVER

Filed Aug. 14, 1951 10 Sheets-Sheet 10

*Inventor*
DESMOND S. RIDLER
*By* R. P. Morris
*Attorney*

Patented Feb. 9, 1954

2,668,870

UNITED STATES PATENT OFFICE 2,668,870

PRINTING TELEGRAPH RECEIVER

Desmond Sydney Ridler, Aldwych, London, England, assignor to International Standard Electric Corporation, New York, N. Y., a corporation of Delaware Application August 14, 1951, Serial No. 241,727

Claims priority, application Great Britain August 21, 1950

5 Claims. (Cl. 178—34)

Figure 7:
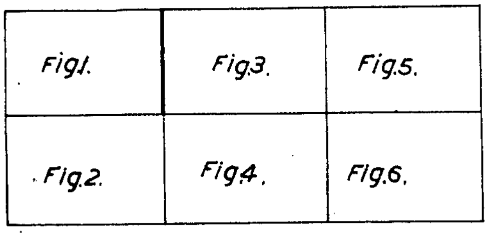

This invention relates to printing telegraph receivers.

Printing telegraph receivers commonly accomplish printing through the agency of a type-wheel bearing embossed representations of the characters it is desired to print, the type wheel being rotated under the control of the received signals to the desired position, and firmly held, printing being then effected by causing the recording medium—usually a paper tape or sheet—and the selected embossed character carried by the type wheel to be pressed together with an inking ribbon interposed between them. There are many ingenious devices for holding the type wheel in the desired position and causing the selected character to be printed but the present invention is only concerned with means for causing the type-wheel to be rotated to the desired position, and initiating the mechanical operations of holding it in position and pressing the embossed type and the recording medium together. In the preferred embodiment of the invention which will be described, the rotating, holding and printing operations are carried out under the control of a plurality of gas-filled electric discharge tubes.

As the type-wheel itself and the holding and printing mechanisms do not form any part of the invention, only a very simplified form of mechanism will be described and illustrated, it being understood that circuits according to the invention can equally well be applied to control the operation of more complicated mechanisms for printing characters, as for example, actuating a case-shift mechanism.

In printing telegraph systems it is almost universal for the characters to be represented by code combinations in which each combination consists of the same number of elements, any one of which can be a "mark" or a "space." For example, in line telegraph operation, a mark can be indicated by negative polarity to line and a space by positive polarity, or if preferred, the successive code elements may consist of applications of a polarity to line for spaces and zero potential to line for marks.

The code in most common use is the well-known five-element code in which each character is built up of a code combination consisting of five permutable code elements sent successively, any one of which elements can be a "mark" or a "space." In addition, it is usual for the transmitting station to send out an invariable start element before the first permutable element of the code combination in order to set the receiving equipment in operation and an invariable stop signal after the last permutable element of the code combination which stops the receiving equipment. It is usual to employ a mark element at the beginning of the stop period and to maintain this marking condition until the next combination is to be sent when it is preceded by a space element acting as the start signal. Thus, for each character transmitted, there is sent out a signal combination of seven elements, namely a start element, a five element code combination and a stop element, which last is usually prolonged until the next start element.

In a well-known type of printing telegraph receiver, a type-wheel is set in rotation upon receipt of a code combination, a set of permutation members (one for each permutable element) controls by its permutational setting the selection of one of a plurality of stop members and the selected stop member stops the rotating type-wheel when the character corresponding to the received code combination is in the printing position.

According to the present invention, there is provided a printing telegraph receiver comprising means for registering a received code combination, means for setting a type-wheel in rotation from a given angular position, means for counting the number of character positions through which said type-wheel is rotated, means for selecting the character corresponding to the received code combination by stopping said type-wheel in a position determined by a comparison between the number of character positions so counted and a number representing said received code combination and means for printing the selected character.

In the embodiment of the invention which will now be described by way of example, the type-wheel always returns to the same angular position between the printing of one character and the next.

Figure 10:
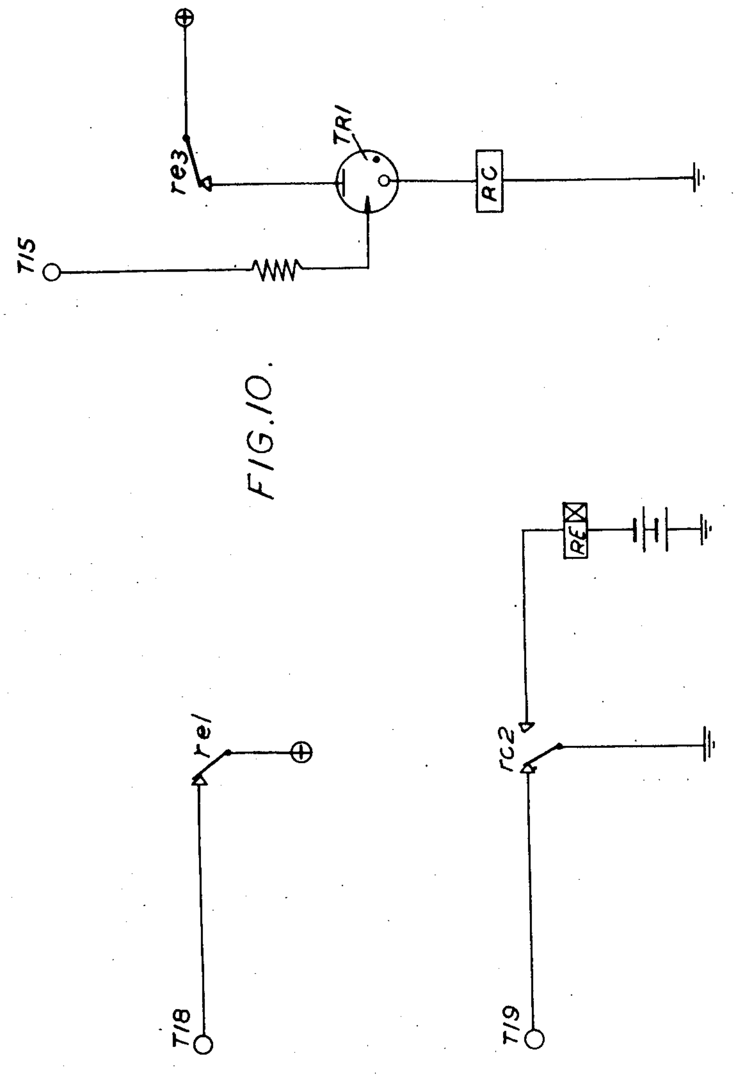
Figure 11:
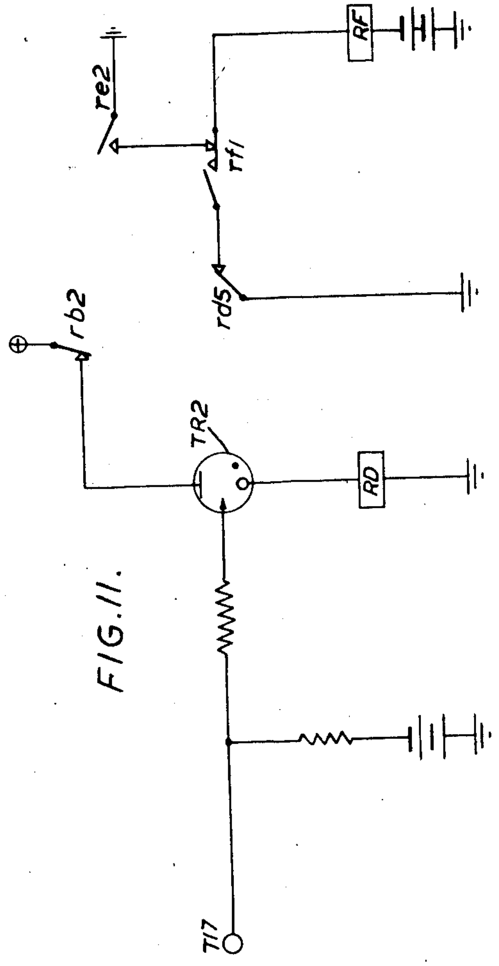
Figure 12:
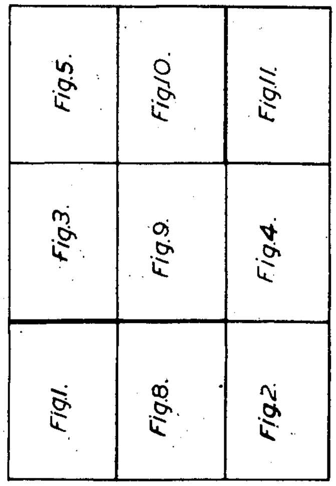

The embodiment to be described together with a modification thereof is illustrated in the accompanying drawings of which:

Figs. 1 to 6 are portions of a complete circuit diagram for carrying out the described embodiment of the invention, Fig. 7 is a block diagram to show how a complete circuit diagram can be built up by mutually relating Figs. 1 to 6, Figs. 8 to 11 are portions of a circuit diagram which, when considered with Figs. 1 to 5 give a complete circuit diagram for carrying out a modification of the embodiment described with reference to Figs. 1 to 6, and Fig. 12 is a block diagram to show how a complete circuit diagram can be built up by mutually relating Figs. 1 to 5 and 8 to 11. It will be apparent from the foregoing list of drawings that none of the circuit figures (i. e. 1 to 6 or 8 to 11) is complete in itself and consequently connections have had to be taken from one figure to another. These connections terminate in one or more numbered terminals at the edge of one figure and are continued from similarly positioned and numbered terminals on an adjacent figure. In each case where this occurs, the number of the terminal at which a connection enters or leaves a figure is stated as well as the appropriate figure number. It is thus possible to follow the description of the circuit figures without laying them out in any particular formation. The understanding of the invention will, however, be assisted by relating the various circuit figures of the drawings as shown in Figs. 7 and 12.

In order to reduce the number of interconnections required between figures, the contacts of certain keys and relays have been shown separately from their operating key or winding. In each case where a contact is shown on a separate figure, reference to that figure has been made by number when referring to the contact concerned. Otherwise, contacts may be assumed to be on the same sheet as the means for operating them.

In carrying out the preferred embodiment of the present invention, extensive use is made of cold-cathode gas-filled tubes. A brief summary of the properties of these tubes will be given before proceeding to the particular description of the circuits involved.

In the case of three electrode tubes, the electrodes are an anode, a cathode and a trigger electrode.

A potential is normally applied between the anode and the cathode which is insufficient to ionise the anode-cathode gap and so cause the tube to become conducting but which is sufficient to maintain the conducting condition when once established.

If a potential of sufficient value is applied momentarily to the trigger electrode, the potential will ionise the trigger-cathode gap and the ionisation will spread to the anode-cathode gap which will become conducting. In this condition the tube is said to be "fired." The tube will remain fired provided that the anode-cathode potential difference does not fall below a minimum value known as the "sustaining" voltage. Alteration or removal of the voltage on the trigger electrode of a tube when fired will not cause the conduction of the tube to cease.

The tube will be "extinguished," i. e. will cease conducting, if the potential difference across the anode-cathode gap is reduced below the value of the sustaining voltage. This may be done externally by either lowering (or removing) the anode potential or by raising the cathode potential.

The "firing" potential (i. e. the potential on the trigger electrode necessary to cause the anode-cathode gap to become conducting) may be built up by first applying a "priming" potential below that necessary to fire the tube (in which state the tube is said to be "primed") and then momentarily adding to it, at the desired instant, a second potential such that the sum of the two potentials is sufficient to fire the tube although neither applied potential is sufficient of itself to do so. In the case of four-electrode tubes, a second trigger electrode is provided which can be used to fire (or prime) the tube from a separate source.

Throughout the ensuing description it will be assumed that the telegraph code in use is the well known five-element Baudot code operating at a signal frequency of fifty elements a second.

In the embodiment now to be described with reference to Figs. 1 to 6 the type-wheel is rotated through the necessary angle to bring into printing position the character corresponding to the received signal combination and after printing has taken place, the type-wheel is further rotated in the same direction until it reaches its initial position where it remains until the receipt of the next signal combination.

The incoming signals control a telegraph relay RA (Fig. 5) having two contact tongues *ra1* and *ra2* each moving between mark and space fixed contacts designated M and S, respectively. The receipt of a start element changes *ra1* and *ra2* over to the space position and the changeover of *ra1* starts up a pulse generator PG1 (Fig. 5) in the manner now to be described.

Pulse generator PG1 comprises two thermionic valves V1 and V2 interconnected as a multivibrator. For the purpose of explanation, V1 and V2 have been shown as triodes interconnected in the simplest possible manner. Preferably, however, V1 and V2 are pentode valves interconnected in the manner described and illustrated in the specification of British Patent No. 636,668 (E. M. S. McWhirter-R. H. Dunn-P. W. Lennox 42–23–5).

The cathode of valve V1 is connected directly to earth but the cathode of V2 is connected to the cathode of a four-electrode gas-filled tube TP1. In the absence of received signals, tube TP1 is fired so that a positive potential is developed at its cathode across cathode load resistor R1. This positive potential applied to the cathode of valve V2 prevents this valve from becoming conducting and its partner valve V1 therefore conducts.

When contact tongue *ra1* changes over to the space contacts on receipt of a start element, it temporarily earths the anode of tube TP1 and thereby extinguishes this tube. This removes the positive bias from the cathode of valve V2 which thereupon becomes conducting and cuts off its partner valve V1. When valve V1 is cut off, its anode potential rises to that of the H. T. supply. The effect of this is to produce a positive pulse at the anode of valve V1. This positive pulse may be assumed to appear virtually simultaneously with the beginning of the start element which initiated its production.

Thereafter the multi-vibrator oscillates in the normal way and, since the positive pulses appearing at the anode of valve V1 are timed to occur at intervals of twenty milli-seconds (i. e. one element time duration) the second and succeeding pulses may be assumed to appear virtually simultaneously with the respective beginnings of the second and succeeding elements of the received signal combination. These pulses appearing at the anode of valve V1 and occurring substantially co-phasally with the received signal elements will be referred to hereinafter as the "timing" pulses.

The multivibrator comprising valves V1 and V2 is arranged to be "symmetrical" i. e. the first pulse produced at the anode of V2 when this valve is cut off is arranged to occur ten milli-seconds after that occurring at the anode of valve V1. The pulses from valve V2 thus occur virtually at the (theoretical) centre of the signal elements and will be referred to hereinafter as the "scanning" pulses.

Figure 3:
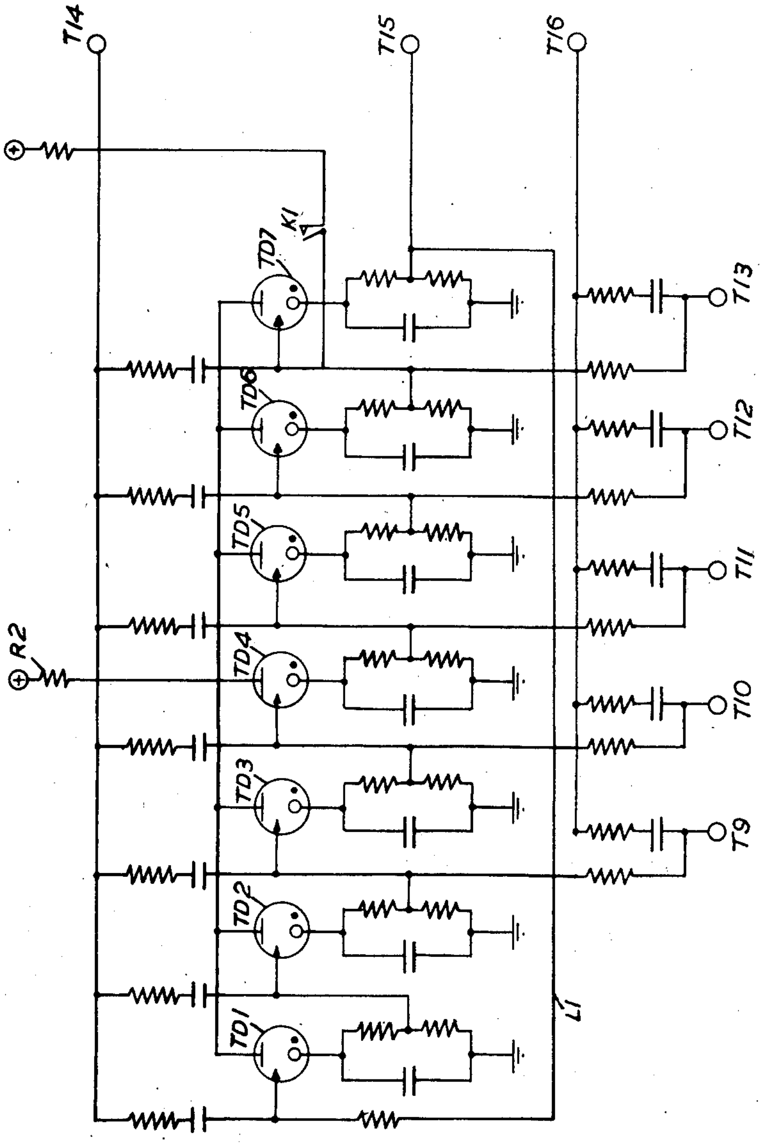

The first timing pulse is applied via terminal T14 to the trigger electrodes of all seven of the chain of three-electrode cold-cathode tubes TD1 to TD7 shown in Fig. 3. This chain of tubes is connected in known manner to form a distributor chain. Successive timing pulses applied via terminal T14 cause one tube after another to be fired, the order of firing being in numerically ascending order. The rise in cathode potential of a fired tube (due to the voltage developed across the cathode load resistor thereof) is used to prime the trigger electrode of the succeeding tube with the exception of TD7 which is used to prime the trigger electrode of TD1 via lead L1. The use of a common anode load resistor R2 ensures that when each tube is fired it reduces the anode potential of the remaining tubes and so extinguishes the one that was previously fired. Thus, only one tube may be fired at a time.

In the intervals between successive signal combinations, tube TD7 is fired and primes tube TD1 over lead L1.

When the first timing pulse arrives via terminal T14 to mark the beginning of a received start element, tube TD1 is fired (and TD7 extinguished). The firing of TD1 primes TD2 for operation by the second timing pulse which occurs twenty-milli-seconds later, at the beginning of the first permutable element (i. e. the element immediately following the start element) of a received signal combination.

The first permutable element will be either a mark or a space depending upon the character represented by the complete signal combination. For illustrative purposes it will be assumed that the received signal combination is (S) MS MMS (M) representing the character "F." The first permutable element is thus a mark.

Figure 4:
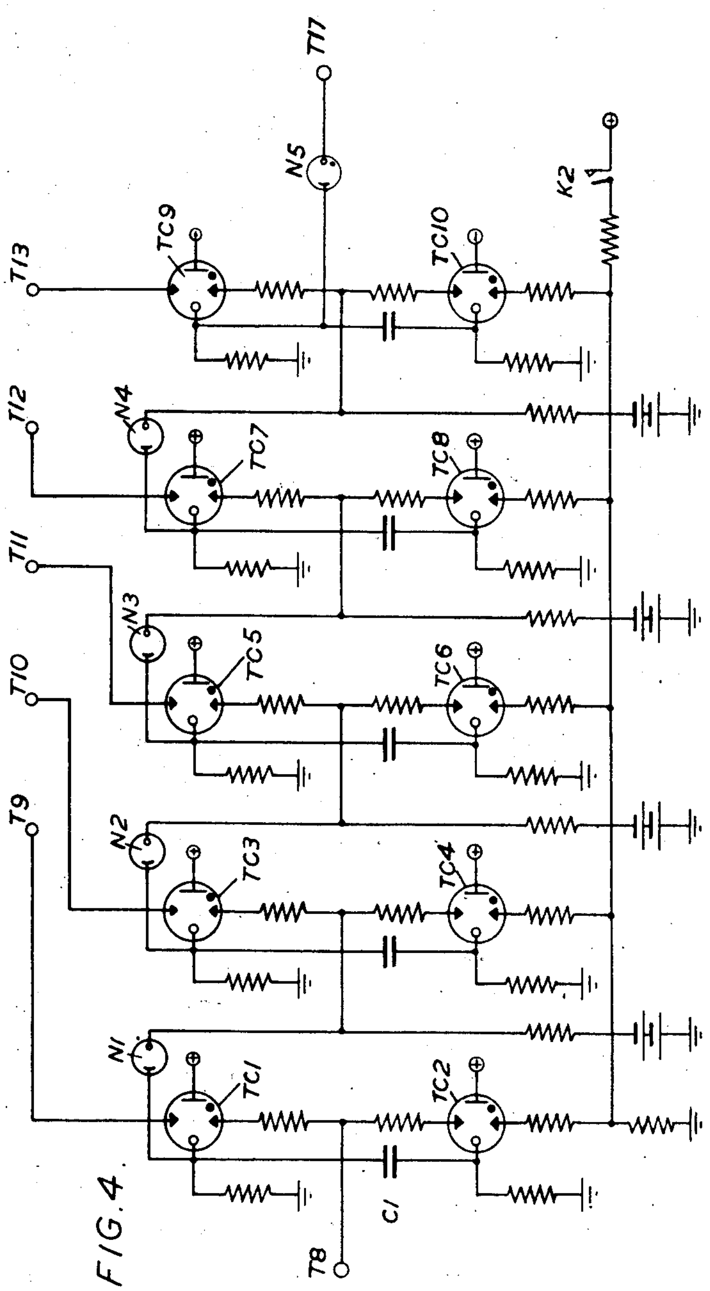

When tube TD2 (Fig. 3) is fired the potential developed across its cathode load resistor, in addition to being used to prime tube TD3 is applied via terminal T9 to the upper (in the figure) of the two trigger electrodes of a four-electrode gas-filled tube TC1 (Fig. 4).

The ten four-electrode tubes TC1 to TC10 form a register chain interconnected with the distributor chain shown in Fig. 3 via terminals T9 to T13. Each pair of tubes (such as TC1 and TC2, or TC5 and TC6) corresponds to one of the five permutable elements of a signal combination.

The cathodes of each pair of tubes are connected together by capacitors such as C1 which connects the cathodes of tubes TC1 and TC2. The firing of either tube will result in its cathode potential being raised to a positive value by virtue of the potential developed across its cathode load resistor. This will cause a positive impulse to be applied via the capacitor to the cathode of the partner tube. The raising of the cathode potential of the latter tube will reduce the potential across the tube below the maintaining potential and the tube will be extinguished. Thus only one tube of a pair may be fired at a time although five tubes of the chain are always fired.

An odd numbered tube when fired represents a space element and an even numbered tube when fired represents a mark element.

In the initial condition i. e. between signals, all five even umbered (i. e. "mark" tubes are fired). In order to register the five permutable elements of a signal combination on the chain of tubes TC1 to TC10 it is only necessary to change over the corresponding pair of tubes when a spacing element is received.

It has already been explained that when tube TD2 of the distributor chain of Fig. 3 is fired at the beginning of the first permutable element of the received signal combination, the positive potential developed across its cathode load resistor is applied via terminal T9 to one of the trigger electrodes of tube TC1 in Fig. 4. This potential is not sufficient of itself to fire tube TC1 and thus extinguish its partner tube TC2, but requires the addition of a scanning pulse from the pulse generator PG1 of Fig. 5.

Figure 5:
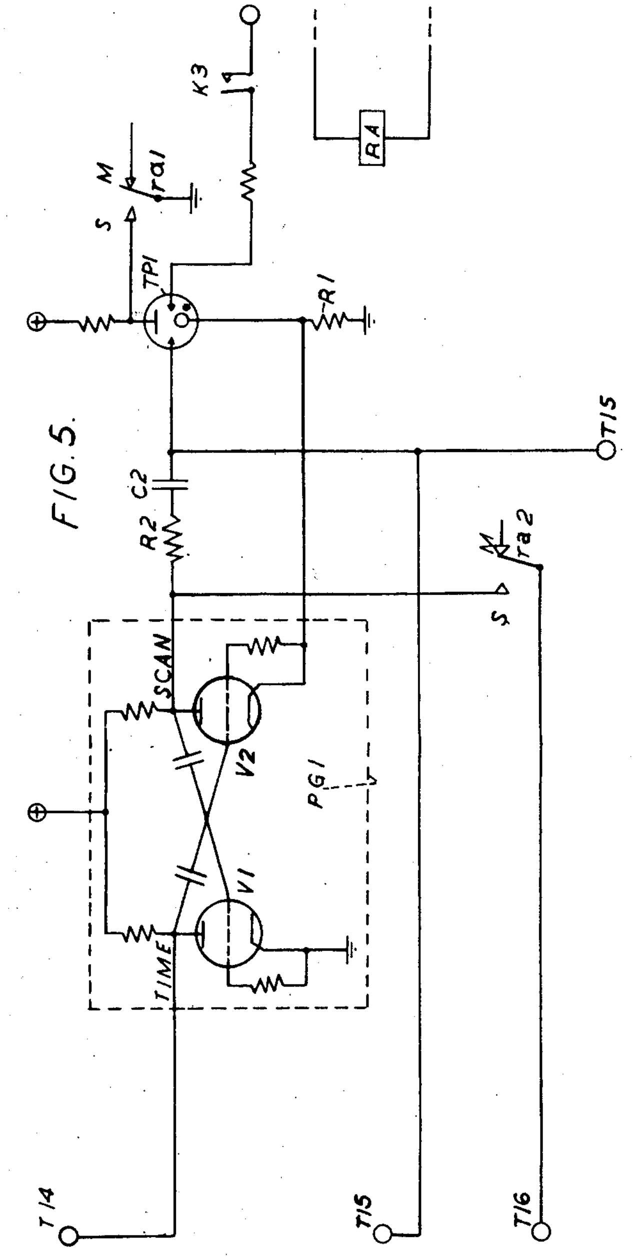
Figure 6:
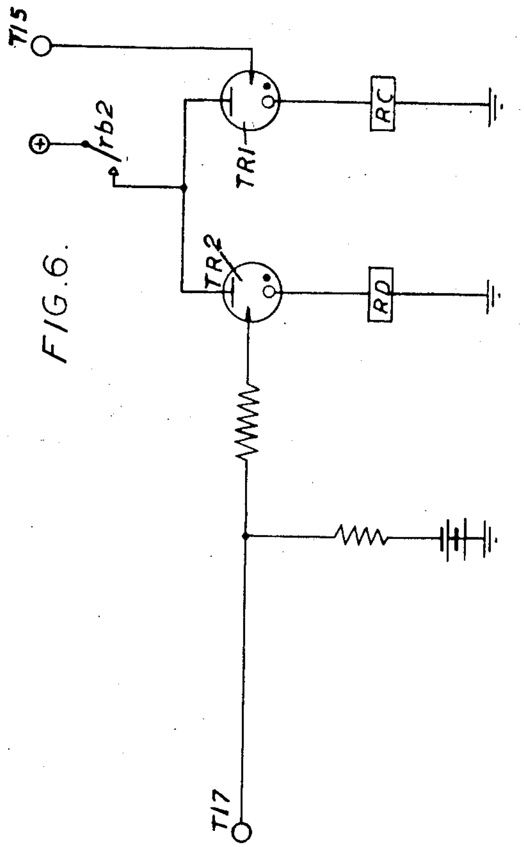

The scanning pulses are applied in parallel to all the odd numbered tubes TC1 to TC9 of Fig. 4 via terminal T16 and contact tongue *ra2* shown in Fig. 5 and thence via terminal T16 in Fig. 3 in parallel to each of the terminals T9 . . . T13, in Fig. 3. Pulses will only appear at terminal T16 if contact tongue *ra2* is in the space position, i. e. if a space element is being received. The first scanning pulse does in fact appear at terminal T16 ten milli-seconds after the appearance of the first timing pulse at terminal T14, since contact tongue *ra2* is in the space position during the receipt of the start element. Since, however, the scanning pulses are not of themselves sufficient to fire any of the odd numbered tubes TC1 to TC9 the first scanning pulse has no effect and can be ignored.

The second scanning pulse is produced by the pulse-generator PG1 (Fig. 5) ten milli-seconds after the second timing pulse has fired tube TD2 (Fig. 3) and the firing of the latter has primed tube TC1 (Fig. 4) via terminal T9.

Since it has been assumed that the first permutable element of the signal combination is a mark, contact tongue *ra2* (Fig. 5) is in the mark position shown when the second scanning pulse is produced by the pulse-generator PG1. The second scanning pulse does not therefore appear at terminal T16 and tube TC1 (Fig. 4), although primed via terminal T9, remains extinguished.

The third timing pulse fires tube TD3 of the distributor chain (Fig. 3), thus extinguishing tube TD2 (from which it was primed). The firing of tube TD3 (Fig. 3) applies a priming potential to tube TC3 (Fig. 4) via terminal T10 while the extinguishing of tube TD2 (Fig. 3) removes the priming potential from tube TC1 (Fig. 4). The condition of the first pair of tubes (TC1 and TC2) of the register chain of Fig. 4 thus remains unaltered to record the fact that the first permutable element of the received signal combination is a mark.

The appearance of the third timing pulse coincides with the beginning of the second permutable element of the received signal combination, which element has been assumed to be a space. Thus, when the third scanning pulse appears ten milli-seconds after the third timing pulse, contact tongue *ra2* (Fig. 5) is in the space position and the third scanning pulse is applied via terminal T16 (Figs. 5 and 3) and terminals T9 to T13 (Figs. 3 and 4) to the (upper) trigger electrodes of the odd numbered tubes TC1 to TC9 of the register chain shown in Fig. 4. Tube TC3 is already primed by tube TD3 of the distributor chain (Fig. 3) via terminal T10 and the third scanning pulse is effective to fire tube TC3. The firing of the latter tube causes the extinction of its partner tube TC4. The changed-over condition of this second pair of tubes in the register chain thus records the fact that the second permutable element of the received signal combination is a space.

The fourth and fifth timing pulses respectively cause tube TC5 and TC7 of the register chain (Fig. 4) to be primed but since the third and fourth permutable elements of the signal combination are assumed to be mark elements, tubes TC5 and TC7 are not fired by the fourth and fifth scanning pulses. The condition of the third and fourth pairs of tubes in the register chain thus remains unaltered to record the fact that the third and fourth permutable elements are both marks.

The sixth timing pulse causes tube TC9 of the register chain (Fig. 4) to be primed while the sixth scanning pulse fires this tube and extinguishes its partner tube TC10 to record that the fifth permutable element of the received signal combination is a space. The tubes of the register chain which are now fired are TC3 and TC9 in the upper (odd) row and TC2, 6 and 8 in the lower (even) row.

The seventh timing pulse fires tube TD7 of the distributor chain (Fig. 3) which was primed when the previous tube TD6 was fired by the sixth timing pulse. The positive potential developed across the cathode load resistor of tube TD7 when it is fired is applied via lead L1 to prime the first tube of the distributor chain, TD1. It is also applied via terminal T15 (Figs. 3, 5 and 6) to one of the trigger electrodes of four-electrode gas-filled tube TP1 (Fig. 5) already mentioned and to the trigger electrode of a three-electrode gas-filled tube TR1 shown in Fig. 6. This positive potential is sufficient only to prime tubes TP1 and TR1.

The seventh scanning pulse is applied via resistor R2 (Fig. 5) and capacitor C2 to the trigger electrodes of tubes TP1 and TR1 and is sufficient when added to the priming potential already applied to fire both tubes. It will be evident from Figs. 5 and 6 that all the scanning pulses from the pulse generator PG1 are in fact applied to the trigger electrodes of tubes TP1 and TR1 but these scanning pulses are not sufficient to fire either tube unless it has been primed.

When the tube TP1 (Fig. 5) is fired by the seventh scanning pulse, the rise in its cathode potential puts a positive bias on the cathode of valve V2 of the multi-vibrator and stops this valve from conducting as previously explained. No more pulses are emitted by the pulse generator PG1 until tube TP1 is again extinguished by the start element of the succeeding signal combination.

When tube TR1 (Fig. 6) is fired by the seventh scanning pulse, a relay RC in its cathode circuit is operated.

Figure 1:
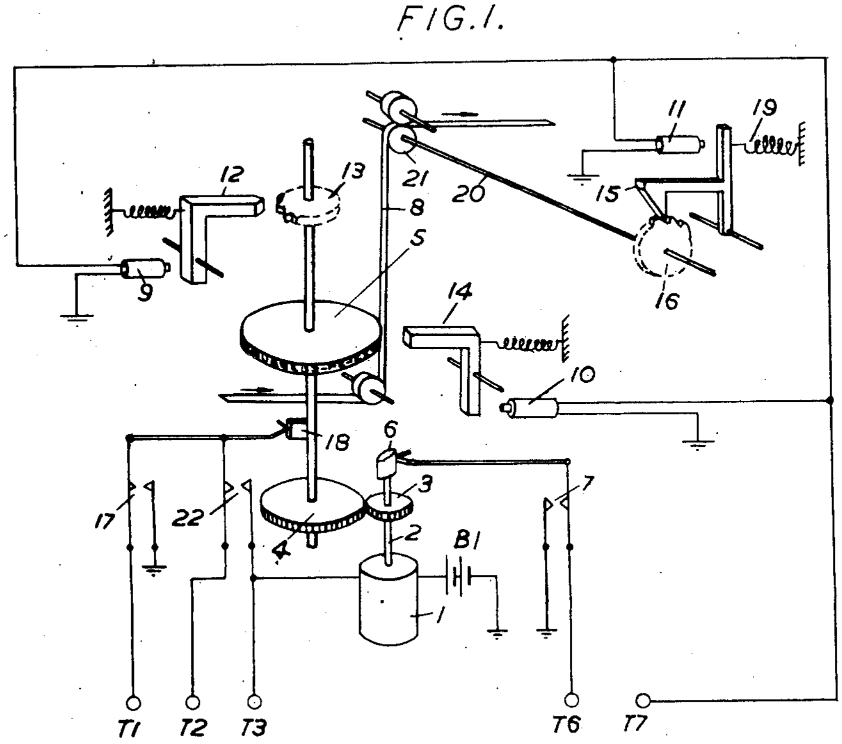
Figure 2:
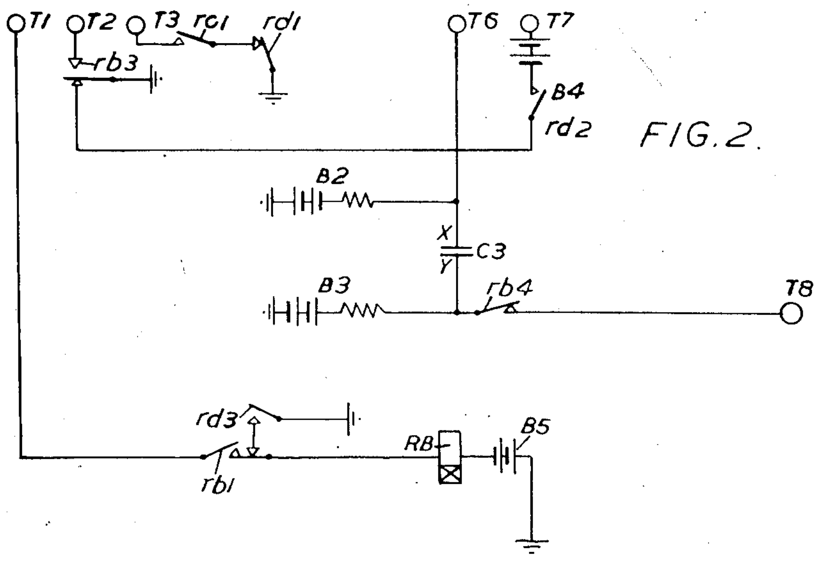

The contact *rc1* operated by relay RC is shown in Fig. 2. Closing contact *rc1* applies an earth over an already closed contact *rd1* and via terminal T3 to one lead of a driving motor 1 (Fig. 1). This completes the motor supply circuit through a battery (or other power source) B1 and the motor 1 starts to rotate a shaft 2 in a clockwise direction. Shaft 2 carries a pinion 3 meshing with a larger pinion 4 fixed to the same shaft as a type-wheel 5. A very elementary form of type-wheel has been shown for explanation purposes. Because the drive from motor 1 is taken via pinions 3 and 4, type-wheel 5 is rotated in an anticlockwise direction.

Fixed to shaft 2 is a cam 6 controlling the opening and closing of a pair of contacts 7. The ratio between pinions 3 and 4 is such that contacts 7 are closed once every time type-wheel 5 moves from one character position to the next i. e. rotates through the angular distance between two adjacent characters.

Referring to Fig. 2, a capacitor C3 has one of its plates X connected to a negative source of potential shown as a battery B2. The other plate Y is connected to a positive source of potential shown as a battery B3. Since the two batteries are in series, the potential of the plate Y with respect to the plate X is equal to the sum of the potentials of the two batteries. The potential of the plate Y with respect to earth is equal to the potential of battery B3 only.

Each time contacts 7 (Fig. 1) are closed earth is applied via terminal T6 to the X plate of capacitor C3. Thus for an instant, the potential of the plate Y with respect to the plate X— i. e. the sum of the two battery potentials—appears between plate Y and earth. Plate Y is connected over a normally closed contact *rb4* to a terminal T8. Thus, a positive pulse appears at T8 each time contacts 7 (Fig. 1) are closed, that is, each time the type-wheel 5 moves from one character position to the next.

In order to bring into printing position the character (in this case F) represented by the received signal combination, the type-wheel 5 (Fig. 1) has to be rotated a pre-determined number of character positions away from its normal rest position. The pulses appearing at terminal T8 are counted by means now to be described and the driving motor 1 is stopped when the number of pulses counted indicates that the type-wheel has reached the right position.

It has already been explained that the received signal combination is recorded by the condition of the successive pairs of tubes in the register chain of tubes TC1 to TC10 shown in Fig. 4.

In order to count the pulses appearing at terminal T8, the chain of tubes TC1 to TC10 is made to act as a binary counter, in which a fired tube represents the digit 1 and an extinguished tube, the digit zero. The method of connection to effect this counting will be apparent from Fig. 4 and the operation will be apparent from the subsequent description. Counting is arranged to take place from left to right in Fig. 4 so that the successive pairs of tubes TC1 and TC2 to TC9 and TC10 can be taken to represent in order $2^0$, $2^1$, $2^2$, $2^3$ and $2^4$.

Originally the five, even-numbered tubes were fired and the five odd-numbered tubes extinguished. The number represented on the odd-numbered tubes in this condition (which corresponds to the combination M M M M M) is zero which is a convenient point from which to commence counting.

When the combination M S M M S (representing the character F) was received it was recorded by firing tubes TC3 and TC9 of the odd-numbered tubes of the register chain on binary counter of Fig. 4. The binary number registered on the odd-numbered tubes was thus increased from zero to $2^1+2^4=18$.

Throughout the description it will be assumed that type-wheel 5 (Fig. 1) has 32 characters arranged round its periphery in a clockwise direction in the order of the binary number equivalent of their respective code combination. Thus, for example, if type-wheel 5 were rotated in a clockwise direction, it would be necessary to rotate it through 18 character positions to bring the character F into printing position since 18 is, as has already been explained, the binary number equivalent to the code combination M S M M S. As, however, the type-wheel in this first embodiment is assumed to rotate in an anti-clockwise direction, to bring the character F into printing position requires the type-wheel to be rotated through 32−18=14 character positions.

To achieve this, means that driving motor 5 (Fig. 1) must be stopped after contacts 7 (Fig. 1) have closed 14 times and caused 14 positive pulses to be fed into the binary counter of Fig. 4.

The first pulse arriving via terminal T8 fires tube TC1 by means of its second trigger electrode (the lower in Fig. 4). Because of the coupling capacitor C1, the firing of tube TC1 extinguishes its partner tube TC2. The number registered on the odd-numbered tubes has now been increased by 1.

The next pulse arriving via terminal T8 refires tube TC2 and extinguishes tube TC1. When tube TC1 is fired its catode is at a positive potential with respect to earth owing to the voltage developed across its cathode load resistor. It has already been explained that tube TC1 is extinguished when its cathode potential is further raised (though only momentarily) by a positive pulse derived from the cathode of tube TC2 and passed via capacitor C1. This momentary increase in potential of the cathode of tube TC1 is sufficient to cause a neon tube N1 momentarily to become conducting and so pass a pulse forward to the second trigger electrodes of the next pair of tubes TC3 and TC4.

The pulse arriving from neon tube N1 fires tube TC4 and extinguishes tube TC3. When tube TC3 is extinguished it causes a pulse to be passed forward from a neon tube N2 to the third pair of tubes TC5 and TC6 in the same way that a pulse was passed forward to the second pair from neon tube N1 when tube TC1 was extinguished.

The pulse arriving from neon tube N2 fires tube TC5 and TC6 becomes extinguished.

The odd-numbered tubes now fired are TC5 and TC9 so that the number registered on the odd-numbered tubes has been increased from 18 to $2^2+2^4=20$, thus indicating that two pulses have been fed into the counter of Fig. 4 at terminal T8 and that the type-wheel (Fig. 1) has moved through two character positions.

The third and fourth pairs of tubes are linked by a neon tube N3 and the fourth and fifth pairs by a neon tube N4. If the train of events is worked through it will be found that the 14th pulse fed into the counter from terminal T8 causes all five pairs of tubes to change over so that the five even-numbered tubes are fired which was the original condition. The change-over of each of the first four pairs of tubes causes a pulse to be sent forward to the next pair while the change-over of the last pair (TC9 and TC10) cause a pulse to be sent forward via neon tube N5 and terminal T17 to fire a three-electrode gas-filled tube TR2 shown in Fig. 6.

When tube TR2 is fired, a relay RD in its cathode circuit opens contact *rd1* and closes contacts *rd2* and *rd3*. All three contacts are shown in Fig. 2.

When contact *rd1* is opened it removes earth from terminal T3 and so breaks the driving circuit to motor 1 (Fig. 1). The type-wheel 5 is thus stopped 14 character positions away from its original position so that the character F is in the printing position i. e. directly in line with a portion of the paper tape 8 on which printing is to take place.

When contact *rd2* (Fig. 2) is closed an earth is applied via a closed contact *rb3* to the negative side of a battery B4. The positive side of battery B4 is connected via terminal T7 through three solenoids 9, 10 and 11 (Fig. 1) in parallel to earth. Closing contact *rd2* therefore causes the simultaneous energisation of solenoids 9, 10 and 11.

The energisation of solenoid 9 causes a locking lever 12 to be rotated clockwise (in Fig. 1) so that its pointed end engages between two teeth of a toothed wheel 13 fixed to the same shaft as type-wheel 5. There are as many teeth on wheel 13 as there are characters on type-wheel 5 and the locking lever 12 acts to hold the type-wheel in the position into which it has been moved.

The energisation of solenoid 10 actuates a printing hammer 14 which presses the paper tape 8 into contact with the character F on type-wheel 5, it being understood that an inking ribbon (omitted for clarity) is interposed between them.

The energisation of solenoid 11 causes a pawl 15 to be fed back one tooth on a ratchet wheel 16 without moving this wheel.

When contact *rd3* is closed (which, of course, occurs simultaneously with the events described above) it applies an earth to complete a circuit through a relay RB (Fig. 2) and a battery B5. Relay RB is of the slow acting type so that the closing of contact *rd3* is not immediately effective.

After sufficient delay to allow printing to take place, slow acting relay RB operates to close make-before-break contact *rb1* (Fig. 2), to open contact *rb2* (Fig. 6), to change-over contact *rb3* (Fig. 2) and to open contact *rb4* (Fig. 2).

The closing of make-before-break contacts *rb1* (Fig. 2) removes the earth that was applied to relay RB through contact *rd3* and re-applies it via contact T1 in the manner now to be explained.

Referring to Fig. 1 terminal T1 is connected to ground if contacts 17 are closed. These contacts are normally biased to be closed and are only opened by a narrow cam 18 fixed to the same shaft as the type-wheel. This cam 18 is operable to open contacts 17 when and only when the type-wheel is in its normal rest position as shown. Thus, when (as in the case being considered) the type-wheel has been moved away from its normal position for the printing of a character, contacts 17 are closed and terminal T1 is earthed. It will thus be seen that release of relay RB (Fig. 2) is now dependant upon the opening of contacts 17 by cam 18 when the type-wheel is again in its normal rest position.

The opening of contact *rb2* (Fig. 6) breaks the anode supply to tubes TR1 and TR2 which in turn causes the release of relays RC and RD.

The opening of contact *rd2* (Fig. 2) as a result of the release of relay RD breaks the circuit from battery B4 (via terminal T7) through solenoids 9, 10 and 11 (Fig. 1).

The release of solenoid 9 removes locking lever 12 from toothed wheel 13 (Fig. 1), while the release of solenoid 10 withdraws the printing hammer 14.

The release of solenoid 11 causes the pawl 15 to be drawn by a spring 19 to the right in Fig. 1 and since the pawl was previously fed back one tooth on ratchet wheel 16 when solenoid 11 was operated, ratchet wheel 16 is advanced in a clockwise direction by one tooth. This acts through a shaft 20 to rotate a feed roller 21 over which paper tape 8 is passed and so causes the paper tape to be advanced past the printing point to receive the next printed character.

The change-over of contact *rb3* (Fig. 2) applies an earth to terminal T2.

Referring to Fig. 1, terminal T2 is connected to one side of motor 1 if contacts 22 are closed. Contacts 22 are opened and closed at the same time as and in the same manner as contacts 17 and so they are closed when terminal T2 is earthed by the change-over of contact *rb*3. The driving circuit of motor 1 (Fig. 1) is thus re-connected and motor 1 begins to rotate again in a clockwise direction as before.

The opening of contact *rb*4 (Fig. 2) disconnects capacitor C3 from terminal T8 so that although contacts 7 (Fig. 1) are opened and closed as the type-wheel once more rotates, no more pulses are applied via terminal T8 to cause the binary counter of Fig. 4 to change its condition.

When the type-wheel 5 (Fig. 1) is back in its normal position, cam 18 opens contacts 17 and 22.

The opening of contacts 17 causes the release of relay RB (Fig. 2) which was being maintained via terminal T1 through its own contact *rb*1.

The opening of contacts 22 breaks the driving circuit to motor 1 and the type-wheel is stopped in its normal rest position.

At the conclusion of the cycle of operations just described the following tubes in the circuit are left in a fired condition:

- Tube TD7 of the distributor chain shown in Fig. 3.
- Tubes TC2, 4, 6, 8 and 10 of the register chain or binary counter shown in Fig. 4.
- Tube TP1 (Fig. 5) holding pulse generator PC1 inoperative.

This is the condition which was assumed at the beginning of the receipt of a signal combination and is, in fact, the condition to which the circuit always returns after a signal combination has been received and the appropriate character printed.

It is however, necessary to provide some means for firing the 7 tubes quoted upon first connecting the circuit to a supply. This means may take the form of a manual key (not shown) controlling contacts K1 (Fig. 3) for firing tube TD7, K2 (Fig. 4) for firing the even numbered tubes TC2 to 10 and K3 (Fig. 5) for firing tube TP1. The tubes are in each case fired by connecting a suitable positive voltage to their trigger electrode, the circuits being obvious.

With the arrangements so far described a second code combination cannot be received and registered on the binary counter until the character corresponding to the first code combination has been printed.

In order to allow a second code combination to be received while printing is taking place in accordance with the first code combination, a storage stage may be introduced wherein the second combination is stored and from which the second combination is transferred en bloc as soon as the binary counter is free to receive it.

Figure 8:
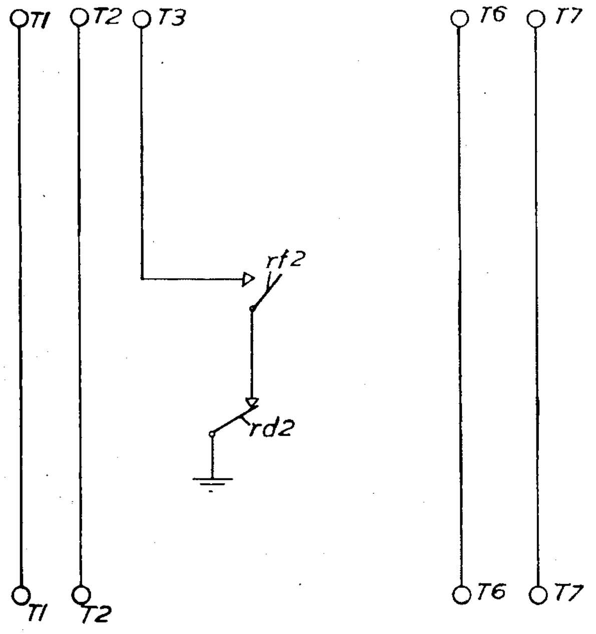
Figure 9:
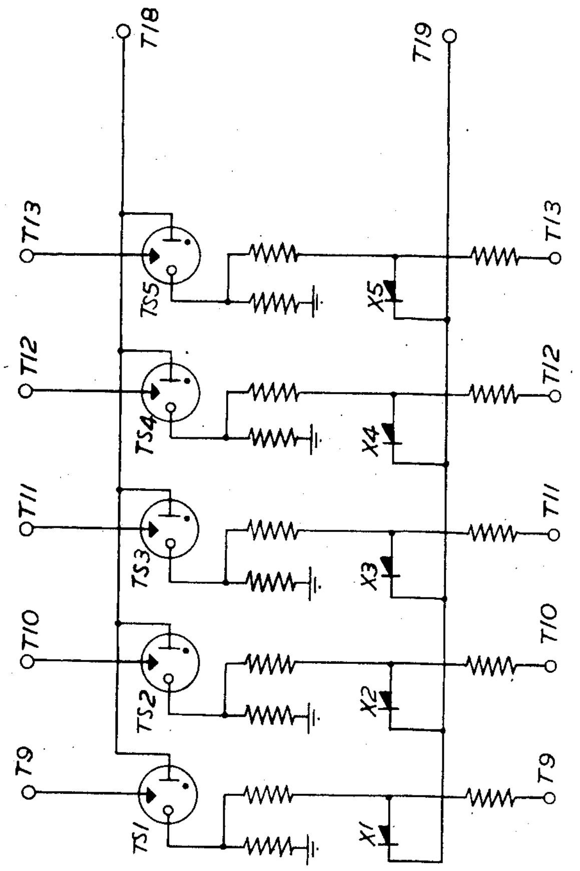

This storage stage may take the form of the chain of cold-cathode tubes TS1 to TS5 shown in Fig. 9 which should be inserted between Figs. 3 and 4. The other modifications required to the circuit are shown in Figs. 8, 10 and 11, the last two of which should replace Fig. 6. In order to obtain a complete picture of a circuit providing storage facilities, Figs. 1 to 5 and 8 to 11 should be related as shown in Fig. 12. The operation of this circuit will now be described insofar as it differs from the operation of the circuit previously described.

Upon receipt of a signal combination, the five permutable elements thereof are registered on the tubes TS1 to TS5 (Fig. 9) under the control of tubes TD2 to TD6 of the distributor chain of Fig. 3 (and via terminals T9 to T13) in the same way as the five permutable elements were previously registered directly on the tubes of the register chain of Fig. 4.

Assuming that the signal combination received is the same as before, namely M S M M S, tubes TS2 and TS5 of Fig. 9 will be fired to register the fact that the second and fifth permutable elements are spaces and the others, marks.

The seventh scanning pulse acts as before to stop the pulse generator PG1 (Fig. 5) and to fire three-electrode cold-cathode tube TR1 (Fig. 10). When tube TR1 is fired, relay RC in its cathode circuit is operated to change-over contact *rc*2 (Fig. 10). Contact *rc*1 although it appears in Fig. 2 is not used in this modification. Similar remarks apply to contact *rd*1 in the same figure.

When *rc*2 changes over it completes the operating circuit of a slow-acting relay RE (Fig. 10) and at the same time removes earth from terminal T19.

Referring to Fig. 9, terminal T19 is connected to the cathodes of five rectifiers X1 to X5. The anodes of these rectifiers are connected to respective cathodes of tubes TS1 to TS5. The cathodes of tubes TS1 to TS5 are also connected via (the lower in Fig. 9) terminals T9 to T13 to the trigger electrodes of the odd numbered tubes of the register chain of Fig. 4.

As long as terminal T19 (Fig. 9) is earthed the rectifiers connected to the cathodes of those storage tubes which have been fired (in this case, rectifiers X2 and X5 connected respectively to the cathodes of tubes TS2 and TS5) hold their respective cathodes at approximately earth potential by effectively short-circuiting most of the cathode load resistor of their respective tubes.

When contact *rc*2 (Fig. 10) changes over to remove earth from terminal T9, the cathode potentials of tubes TS2 and TS5 (Fig. 9) rise as a result of the re-introduction of their cathode load resistors. The increase of potential on the cathode of storage tube TS2 is applied via terminal T10 to fire tube TC3 of the register chain of Fig. 4 while the increase in cathode potential of storage tube TS5 is applied via terminal T13 to fire tube TC9 of the register chain.

The firing of tubes TC3 and TC9 extinguishes their partner tubes TC4 and TC10 so that the register chain of Fig. 4 is now in the same condition as when in the embodiment first described it was set directly under the control of the distributor chain of Fig. 3.

After the stored combination has been transferred, the slow-acting relay RE (Fig. 10) operates to open contacts *re*1 and *re*3 (Fig. 10) and to close contact *re*2 (Fig. 11).

When contact *re*1 (Fig. 10) opens it removes the anode supply (via terminal T18) to all five storage tubes TS1 to TS5 (Fig. 9) so that when the anode supply is re-connected all five tubes will be extinguished.

When contact *re*2 (Fig. 11) closes it applies an earth to one side of a relay RF and so completes its operating circuit.

When contact *re*3 (Fig. 10) opens it breaks the anode supply to tube TR1 and so causes the release of relay RC.

The release of relay RC changes back contact *rc*2 (Fig. 10) thus re-connecting (via terminal T19) earth to the cathodes of the five rectifiers X1 to X5 (Fig. 9). The changing-back of contact *rc*2 (Fig. 10) also releases relay RE (Fig. 10).

The re-closing of contact *re*1 (Fig. 10) reconnects (via terminal T18) the anode supply to the storage tubes TS1 to TS5 of Fig. 9. The storage tubes are now ready to store the next signal combination.

The re-opening of contact *re*2 (Fig. 11) opens the earth return to relay RF but this relay has by this time operated and completed an alternative earth return path for itself through its own contact *rf*1.

The closing of contact *rf*2 (Fig. 8) by the operation of relay RF (Fig. 11) applies an earth to terminal T3, thus completing the driving circuit (through battery B1) to motor 1 (Fig. 1). The motor 1 rotates the type-wheel to the required character position and relay RD (Fig. 11) operates as before to stop motor 1 and cause printing to take place. In this modification, relay RD is provided with a fifth contact *rd*5 which opens to release relay RF.

After printing has taken place, the type-wheel is returned to its normal rest position in the same way as previously described.

While the principles of the invention have been described above in connection with specific embodiments, and particular modifications thereof, it is to be clearly understood that this description is made only by way of example and not as a limitation on the scope of the invention.

What I claim is:

1. Printing telegraph receiver comprising register means having a normal condition, means for altering the condition of said register means in response to the elements of a received code combination, a rotatable typewheel having type characters spacedly positioned therearound, means coupled to said register means for setting said typewheel in rotation from a given angular position in response to the last element of said received code combination, means under control of said typewheel for producing a counting signal for each character position through which said typewheel is rotated, means for applying said signals to said register means to change said register means from its altered condition to its normal condition, the number of counting signals required to change said register means to its normal condition being equal to the character positions through which said typewheel is required to be rotated to arrive at the angular position of the type character corresponding to said received code combination, printing means under control of said register means operable upon the change of said register means from its altered to its normal position, and means under control of said typewheel to return said typewheel to its given angular position.

2. Printing telegraph receiver as claimed in claim 1 in which the number representing each respective code combination is obtained by regarding the successive permutable elements of said combination as successive digits in a binary scale of notation, the value of each digit (i. e. 0 or 1) depending upon the character (i. e. mark or space) of the corresponding code element.

3. Printing telegraph receiver as claimed in claim 2 in which the said register means comprises a plurality of cold-cathode discharge devices interconnected to serve as a binary counter.

4. Printing telegraph receiver as claimed in claim 3 in which the total capacity of said binary counter is equal to the number of character positions on said type-wheel, in which means is provided for registering said register means the number representing the received code combination and for adding thereto the number of character positions through which said type-wheel is rotated and in which means is provided for stopping said type-wheel when the sum of both the last mentioned numbers equals the total capacity of said register means.

5. Printing telegraph receiver as claimed in claim 3 further comprising means for storing a second received code combination during the selection and printing of the character corresponding to the previously received code combination.

DESMOND SYDNEY RIDLER.

References Cited in the file of this patent

UNITED STATES PATENTS

| Number | Name | Date |
|---|---|---|
| 2,523,300 | Herbst et al. | Sept. 26, 1950 |
| 2,540,654 | Cohen et al. | Feb. 6, 1951 |
| 2,557,964 | Herbst | June 26, 1951 |